United States Patent

[11] 3,600,884

| [72] | Inventors | Akiyoshi Yazawa<br>Tokyo;<br>Reizo Fujisaki, Tokyo; Yoshimi Nakamura,<br>Ashiya, all of, Japan |
|---|---|---|
| [21] | Appl. No. | 804,779 |
| [22] | Filed | Mar. 6, 1969 |
| [45] | Patented | Aug. 24, 1971 |
| [73] | Assignees | Bridgestone Tire Company Limited<br>Tokyo, ;<br>Kobe Steel Limited<br>Kobe, Japan |
| [32] | Priority | July 9, 1968 |
| [33] |  | Japan |
| [31] |  | 57986/68 |

[54] STEEL CORD FOR REINFORCING RUBBER ARTICLES
3 Claims, 4 Drawing Figs.

[52] U.S. Cl. .................................................... 57/139, 57/145, 57/149
[51] Int. Cl. ..................................................... D02g 3/48

[50] Field of Search ............................................ 57/139, 145, 147, 148, 149, 144

[56] References Cited
UNITED STATES PATENTS

| 2,491,293 | 12/1949 | Zerr ............................ | 57/148 X |
| 2,792,868 | 5/1957 | Benson ....................... | 57/148 X |
| 3,075,344 | 1/1963 | Fenner et al. ................ | 57/147 |

FOREIGN PATENTS

| 411,940 | 6/1934 | Great Britain ............... | 57/148 |
| 652,585 | 4/1951 | Great Britain ............... | 57/148 |

*Primary Examiner*—John Petrakes
*Attorney*—Stevens, Davis, Miller & Mosher

ABSTRACT: Steel cords for reinforcing rubber articles comprising four twisted steel wires twisted together into steel cords. Each twisted steel wire consists of seven straight steel wires each having a same diameter and twisted together. The twisting direction of the four twisted steel wires is opposite to that of the seven straight steel wires.

PATENTED AUG24 1971          3,600,884

INVENTORS
AKIYOSHI YAZAWA
REIZO FUJISAKI
YOSHIMI NAKAMURA

BY Stevens, Davis, Miller&Mosher

ATTORNEYS

STEEL CORD FOR REINFORCING RUBBER ARTICLES

This invention relates to a steel cord embedded in tires for use in vehicles, conveyor belts or any other rubber articles for the purpose of reinforcing these rubber articles.

Such steel cords have generally been plated on the surface thereof with metals such as brass so as to improve the adhesive property of the steel cords with rubber. These steel cords, however, have the disadvantages that their adhesive force with rubber is not sufficient enough, and that a number of thin steel wires must be twisted together to form steel cords in order to satisfy a high fatigue strength and flexibility required for these steel cords, with the result that the manufacturing cost thereof becomes expensive.

The principal object of the invention is to obviate the above-mentioned disadvantages and provide an improved form of a steel strand for reinforcing rubber articles.

Another object of the invention is to provide an improved steel cord adapted for use in rubber articles such as tires, conveyor belts, etc. and having the additional advantage that the adhesive force with rubber and physical properties are improved, and that manufacture of less an expensive steel cord is possible.

A feature of the invention is the provision of such an improved form of a steel cord which incorporates seven steel filaments each having a same diameter and twisted together to provide a steel strand and four of the steel strands are twisted together in a direction opposite to the twisting direction of the steel filaments into the steel cord.

In the invention the pitch of each of the steel strands may be determined as 12–28, preferably 20 times larger than the diameter of the strand and the pitch of the steel cord may be determined as 6–14 preferably 10 times larger than the diameter of the cord.

Other objects, features and advantages of the invention will become apparent from a consideration from the following specification is considered in conjunction with the accompanying drawing, which illustrates in:

Figure 1:
FIG. 1 is an enlarged front view showing steel cord according to the invention.
Figure 2:
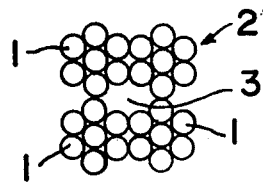
FIG. 2 is an enlarged sectional view diagrammatically illustrating the steel cord shown in FIG. 1.

Referring to FIGS. 1 and 2, 1 designates a steel filament and 2 a steel strand comprising seven steel filaments 1.

In accordance with the invention, four steel strands 2 are twisted together in a direction opposite to the twisting direction of the steel filaments 1 into the steel cord.

Figure 3:
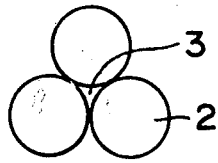
FIGS. 3 and 4 are enlarged sectional views diagrammatically illustrating forms of the steel cords.

The steel cord thus obtained are provided at the center thereof with a cavity 3 which is larger than that of a conventional steel cord formed by twisting together three twisted steel wires 2 as shown in FIG. 3 and hence are capable of penetrating rubber into a core region of the steel cord, resulting in an adhesive force of the steel cord being increased.

Moreover, the steel cord according to the invention makes it possible to prevent wear and fatigue thereof caused by mutual friction between the steel filaments 1.

Figure 4:
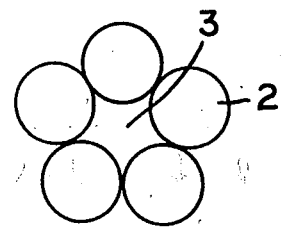

Conventional steel cords formed by twisting together five or more steel strands 2 are capable of forming a cavity 3 as shown in FIG. 4 which is larger than that of the steel cords according to the invention, but these steel cords comprising five or more steel strands 2 are too unstable to maintain their configurations.

The use of the steel strand 2 consisting of seven steel filaments 1 makes the cross section of the steel strands 2 substantially circle and further provides the important advantage that the configuration of four steel strand 2 is highly stable, and that the cavity 3 formed at the center thereof becomes the largest in the stable state.

Furthermore, as set forth in the embodiment of this invention shown in FIG. 2, each of the four strands is in contact only with two adjacent strands and the lines connecting the centers of said adjacent strands are at right angles to each other. Thus, there is provided at the center of the steel cord a dimensionally stable cavity of the maximum cross-sectional area as hereinabove described.

Moreover, the steel cords according to the invention comprise seven steel filaments 1 each having a same diameter so that they are simple in construction and can be manufactured in a less expensive manner if compared with conventional steel cords having the same physical properties.

Even if the diameter of the steel filament 1 is made large so as to reduce the number of the steel filaments 1 less than seven, it is impossible to obtain steel cords having excellent antifatigue property and flexibility.

Thus, the invention provides an economical way of forming the steel cord provided at its center with a large cavity for facilitating penetration of rubber therein and stable in its configuration and as a result of this the advantage is obtained that, as clearly explained, the adhesive force of the steel cord with rubber can be improved which considerably facilitates the mutual connection of the twisted steel wires into an integral body, and that the steel cord can be manufactured in a less expensive manner.

The invention will now be described with reference to examples.

EXAMPLE 1

Seven steel filaments each having a diameter of 0.18 mm. were twisted together with a pitch of 10.8 mm. to provide a steel strand. Then, four of these steel strands were twisted together with a pitch of 13.0 mm. in a direction opposite to the twisting direction of the steel filament into the steel cord (abbreviated as 4×7), whose physical properties were measured.

For the sake of comparison, seven steel filaments each having a diameter of 0.15 mm. were twisted together to provide a steel strand. Then, five of these steel strands were twisted together around a core consisting of a steel strand formed by twisting three steel filaments each having a diameter of 0.15 mm. into the steel cord (abbreviated as 1×3+5×7), whose physical properties were measured.

Four steel filaments each having a diameter of 0.18 mm. were twisted together to provide a steel strand. Then six of these steel strands were twisted together around a core consisting of a steel strand formed by twisting four steel filaments each having a diameter of 0.18 mm. into the steel cord (abbreviated as 1×4+6×4), whose physical properties were also measured.

The results of the above-mentioned three measurements are listed in the following table.

| Physical properties measures | 4×7 | Steel cords 1×4+6×4 | 1×3+5×7 |
| --- | --- | --- | --- |
| Breaking force (Kg) | 183 | 184 | 186 |
| Elongation in case of rupture (%) | 2.45 | 2.59 | 2.33 |
| Breaking force of straight wire (Kg) | 6.65 | 6.85 | 5.10 |
| Breaking force after fatigue (Kg) | 176 | 174 | 178 |
| Flexibility (g) | 8.544 | 9.790 | 15.842 |
| Adhesive force I (Kg) | 145 | 130 | 115 |
| Adhesive force II (Kg) | 9.5 | 7.4 | 5.1 |

In the above table, the breaking force after fatigue is measured as follows. At first the steel cord is embedded into rubber. Then, the rubber is vulcanized and bent one hundred thousand times under a constant load. Subsequently, the steel cord is taken out of the rubber and the breaking force of this steel cord is measured.

The flexibility means a force required to bend a given length of the steel cords whose one end is made stationary until they become deformed into a shape having a given curvature.

The adhesive force I means a force required to withdraw the steel cords embedded into rubber out of the latter.

The adhesive force II means a force required to peel the steel cords embedded into rubber from the latter.

As seen from the above table, the steel cord 4×7 according to the invention is superior in the adhesive forces to the conventional steel cords 1×4+6×4 and 1×3+5×7.

Moreover, the steel cord 4×4 according to the invention, when inspected after the adhesive forces have been measured, show that rubber is penetrated into the core region.

The steel cord 4×7 according to the invention can simplify its manufacturing steps thereby making its manufacturing cost 10 percent less than that of the conventional steel cord 1×4+6×4 and 15 percent less that that of the conventional steel cord 1×3+5×7. The physical properties other than the adhesive force of the steel cord 4×7 according to the invention are equivalent or superior to those of the conventional steel cords.

It will be understood that the invention is not limited to the one embodiment described and that many modifications and applications may be introduced therein without departing from the scope of the invention.

What we claim is:

1. Steel cord for reinforcing rubber articles consisting of four strands, each strand constructed by twisting together seven steel filaments, each filament having the same diameter, in a direction opposite to the twisting direction of said four strands, each strand being in contact only with the two adjacent strands and the lines connecting the centers of adjacent strands being at right angles to each other thereby providing at the center of the steel cord a stable cavity of the maximum cross-sectional area.

2. Steel cord according to claim 1 wherein the pitch of each of said strands is from 12 to 28 times larger than the diameter of the strands and wherein the pitch of the steel cord is from six to 14 times larger than the diameter of the cord.

3. Steel cord according to claim 1 wherein the pitch of each of said steel strands is 20 times larger than the diameter of said strand and wherein the pitch of said steel cord is 10 times larger than the diameter of said steel cord.